May 31, 1938.  J. A. M. BISING  2,119,126
THERMOMETER
Filed Feb. 4, 1937
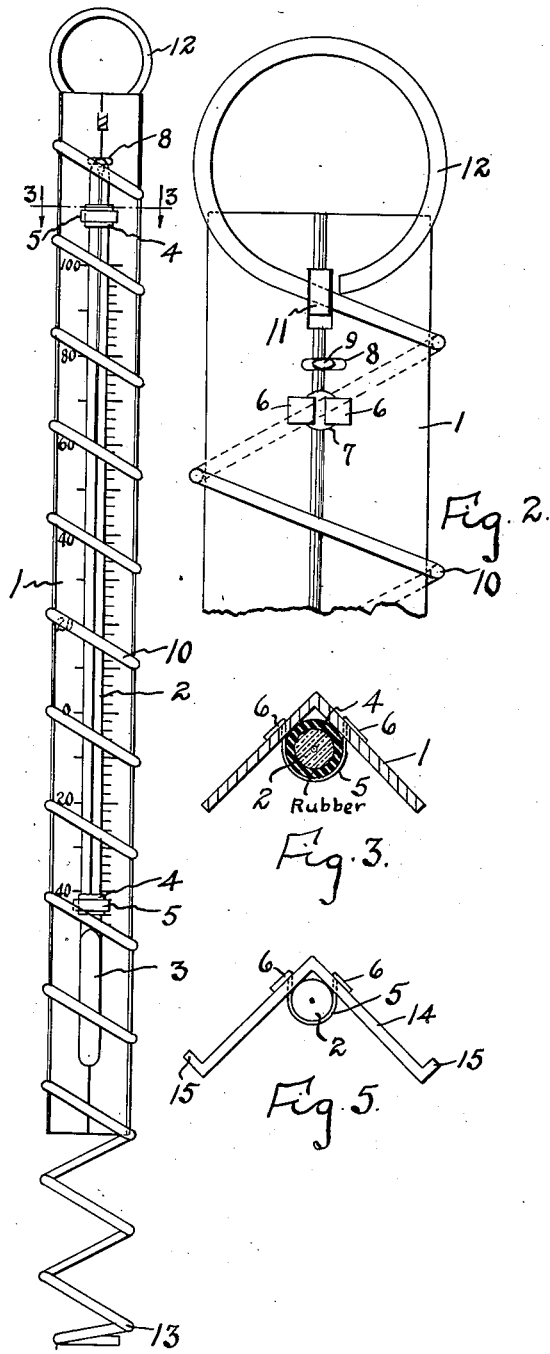
INVENTOR.
James A. M. Bising.
BY
Darby & Darby
ATTORNEYS Patented May 31, 1938

2,119,126

UNITED STATES PATENT OFFICE 2,119,126

THERMOMETER

James A. M. Bising, Jersey City, N. J., assignor to Manning, Maxwell & Moore, Inc., New York, N. Y., a corporation of New Jersey Application February 4, 1937, Serial No. 123,980

5 Claims. (Cl. 73—343)

This invention relates to improvements in thermometers particularly of the portable type employed on shipboard and used on the end of a string or chain for lowering into the hold and similar places to take temperature readings.

The general object of this invention is to provide a simple, inexpensive structure suitably safeguarded against injury to which a portable instrument of this type is subject.

The objects of this invention include many detailed improvements in structure of this type which will best become apparent from the following detailed description of one physical form of the invention.

This invention resides substantially in the combination, construction, arrangement and relative location of parts, all as will be pointed out in the following specification in connection with the attached drawing.

In the accompanying drawing

Figure 1 is a front elevational view of the thermometer of this invention;

Figure 2 is an enlarged rear elevational view of the upper end thereof;

Figure 3 is a cross-sectional view taken on the line 3—3 of Figure 1 with the spiral casing removed;

Figure 4 is a top plan view of the thermometer of Figure 1;

Figure 5 is a top plan view of a modified form of scale construction with the spiral housing removed; and Figure 6 is a similar view of a further modified scale.

The thermometer comprises a V-shaped scale plate 1 preferably constructed of a thin strip of suitable metal desirably of a kind not particularly subject to corrosion such as stainless steel. Suitably displayed on this strip, as by direct stamping thereon is a graduated scale as shown indicating temperatures. Mounted in the bottom of the V-shaped trough formed by the strip 1 is the thermometer tube 2. This tube, which is commonly of glass, is preferably a round tube as distinguished from the lens glass type of tube sometimes employed in this art. The position of the tube in front of the scale and at the base of the trough in combination with the type of spiral protecting cage described below makes it possible to employ an ordinary round capillary glass tube as distinguished from the lens glass tube. The lens glass tube which is of magnifying nature and employed to facilitate reading is decidedly weaker in a physical sense than the round glass tube, as is well known in the art, and can only be easily read when viewed from a restricted angle. On the other hand the round glass tube may be read from any angle within which the tube itself is visible, and is notoriously stronger physically. The use of the round glass tube is made possible by its position at the base of the trough in the V-shaped strip, and by reason of the spiral protecting cage. The reading of temperatures is facilitated by reason of the fact that the scale printed on the inner faces of the sides of the V strip is in itself V-shaped, making the graduations and the numbers clearly visible and showing them in accurate relationship to the capillary column in the tube.

The lower end of the tube instead of being spherical as is common in this art is cylindrical in form and of substantially the same diameter as the glass tube as shown at 3. This makes it possible to place the glass tube right at the base of the trough and does not necessitate a special opening in the V strip to accommodate the bulb as would be necessary if it were spherical in form. This contributes to the protection thereof. The upper end of the tube is provided with an extension or button 9 which fits into a slot 8 in the V strip serving to vertically position the tube and in cases where it is not tightly clamped it prevents it from sliding from under the clamps.

In the form shown in Figures 1 to 3 inclusive the tube is fastened in the V strip by the straps 5 which encircle it and have its ends 6 which pass through the openings 7 in the V strip bent over to lock the straps in place. If desired, as a matter of additional safety, resilient collars 4 of rubber for example are fitted over the tube and lie under the straps keeping the glass tube out of contact with the adjacent metal parts.

The unit formed by the glass tube clamped in the V strip is provided with a protecting cage entirely surrounding it and of such construction as to permit of substantially complete visibility of the tube and scale. This cage is formed by helically winding a strip, rod or wire of suitable material such as metal as indicated at 10, which terminates at the upper end in a bail 12 and at the lower end in an extension which gradually reduces in diameter as indicated at 13. This cage is wrapped sufficiently tight so as to permanently bind the V strip holding it securely in place and is permanently attached to the strip at the upper end by means of a struck up tab 11 which overlies it and clamps it in place, as is clear from Figure 2. The lower end 13 of the cage is of sufficiently reduced diameter, as indicated, to render it difficult to inadvertently injure the glass tube by the penetration within the cage of objects from the lower end. A cage of this type is also resilient so that if the thermometer is dropped so as to strike the ground, particularly in a longitudinal direction, the shock will be readily absorbed by the projecting end 13. This type of cage quite adequately protects the glass tube particularly against the entry of projections when the thermometer is swinging, as it is likely to do when attached to the end of a cord or chain. The convolutions of the cage are sufficiently closely spaced so as not to materially interfere with the reading of the thermometer and by the same token prevent injury to the glass tube.

Since a thermometer of this type is often used by dropping it down into the hold of a ship, it is desirable that it be sluggish in action so that its reading will not be changed during the time it is pulled up from the hold to the deck. This feature is secured by making the cylindrical bulb 13 of considerable volume with respect to the volume of the capillary tube in the glass tube so that the column will move slowly under the changes in temperature conditions. This action is further facilitated by employing a glass of relatively low heat conductivity in the manufacture of the tube in combination with an alcohol and red coloring matter for the fluid, in accordance with practice known in the art.

To further strengthen the structure when the additional expense is justified the V strip may take other forms. For example in Figure 5 the edges of the strip are shown provided with integral flanges 15 which longitudinally strengthen the strip. This figure also illustrates the fact that under some conditions the rubber or resilient collars 4 may be eliminated and the tube 2 clamped directly against the walls of the strip by the straps 5. The V strip may also be strengthened as illustrated at 16 in Figure 6. In this case the apex of the strip is substantially rectangular in form indicated at 17 and is provided with a strip of resilient material as indicated at 18 extending longitudinally in the trough thus formed. This strip for example may be made of self curing rubber and the glass tube 2 may be made to firmly adhere thereto by coating it at the area which will contact with the strip 18 with a suitable adhesive such as sodium silicate. The tube is then clamped against the strip 18 by means of the straps 5 as before. This provides a particularly rugged structure and one which is very effective in protecting the glass tube against breakage. The center of gravity of this structure is toward the back so that when it is dropped it has a tendency to always fall on its back so that the rubber strip provides excellent protection against breakage. As before, the V strips of Figures 5 and 6 may be enclosed in a helically wound cage in accordance with the disclosure of Figure 1.

From the above description it will be apparent to those skilled in the art that the structure of this invention successfully attains the objects sought by constructional features which may be varied by those skilled in the art without departure from the true scope of the invention. I do not, therefore, desire to be strictly limited to the disclosure as given for purposes of illustration, but rather to the scope of the appended claims.

What I seek to secure by United States Letters Patent is:

1. A thermometer comprising a supporting strip having a scale thereon, a capillary tube secured to said strip and an open cage surrounding the strip comprising a helically wound wire.

2. A thermometer comprising a supporting strip having a scale thereon, a capillary tube secured to said strip and an open cage surrounding the strip comprising a helically wound wire, the convolutions of the cage extending below the strip.

3. A thermometer comprising a supporting strip having a scale thereon, a capillary tube secured to said strip and an open cage surrounding the strip comprising a helically wound wire, the convolutions of the cage extending below the strip and terminating at the upper end in a bail.

4. A thermometer comprising a trough shaped strip having a scale on the inner face thereof, a capillary thermometer tube secured within the trough and superimposed upon said scale, and a protecting cage comprising a helically wound wire enclosing the strip and firmly engaging it, said cage extending below the strip and being of decreasing diameter.

5. A thermometer comprising a V-shaped strip of metal having a scale on the inner face of the strip, a capillary thermometer tube secured to the strip in front of the scale, and a protecting cage surrounding the strip comprising a helically wound wire, the wire of the cage extending below the lower end of the strip and above the upper end of the strip to form a bail, said strip having a struck-up tab interlocked with the wire of the cage to relatively position the strip and cage.

JAMES A. M. BISING.